United States Patent [19]
White

[11] Patent Number: 5,944,766
[45] Date of Patent: Aug. 31, 1999

[54] CRUISE CONTROL ECONOMIZER

[76] Inventor: Lee S White, 27400 W. Mansfield Rd., Folsom, La. 70437

[21] Appl. No.: 09/057,750

[22] Filed: Apr. 9, 1998

[51] Int. Cl.[6] .......................... B60K 31/00; B60K 41/28; G05D 13/64; F02D 41/14

[52] U.S. Cl. .......................... 701/94; 73/118.1; 73/510; 701/54; 701/65; 701/70; 701/93; 180/179

[58] Field of Search ................................. 73/116, 117.2, 73/117.3, 118.1, 119 A, 506, 507, 508, 509, 510; 701/110, 54, 65, 70, 79, 93, 94; 180/179

[56] References Cited

U.S. PATENT DOCUMENTS

| | | | |
|---|---|---|---|
| Re. 36,007 | 12/1998 | White et al. ................................ | 477/91 |
| 4,408,293 | 10/1983 | Avins ........................................ | 701/70 |
| 4,914,597 | 4/1990 | Moncelle et al. ........................ | 701/93 |
| 4,961,475 | 10/1990 | Kurihara et al. ........................... | 701/94 |
| 5,019,986 | 5/1991 | Londt et al. ............................... | 701/94 |
| 5,224,045 | 6/1993 | Stasell ...................................... | 701/94 |
| 5,483,927 | 1/1996 | Letang et al. ............................ | 180/179 |
| 5,615,654 | 4/1997 | Weisman, II et al. .................. | 123/436 |
| 5,752,214 | 5/1998 | Minowa et al. ........................... | 701/70 |
| 5,847,644 | 12/1998 | Weisman, II et al. .................. | 340/439 |
| 5,868,214 | 2/1999 | Workman .................................. | 701/93 |

*Primary Examiner*—George Dombroske

[57] ABSTRACT

A new cruise control economizer for utilizing momentum gained on downhill travel which operates by selectively overriding a throttle on a vehicle with electronic throttle controls during and after the vehicle is traveling down an incline gaining momentum with minimum fuel consumption. The inventive device includes at least one POM (prolongation of momentum) switch, a microcontroller, a vehicle speed input, a brakes or clutch pressed input, and a vehicle setback throttle means to override cruise control output and send modified throttle setting signals that override electronic cruise controls.

7 Claims, 8 Drawing Sheets

CRUISE CONTROL ECONOMIZER

BACKGROUND OF THE INVENTION

1. Field of the Invention

The present invention relates to electronic controls used to control fuel supplied to a diesel engine and more particularly pertains to a new cruise control economizer used as an accessory to an electronic cruise control for selectively setting throttle for a vehicle traveling on an incline to gain momentum with minimum fuel consumption.

2. Description of the Prior Art

Known inventions in the prior art include U.S. Pat. No. 5,205,161; U.S. Pat. No. 5,148,789; U.S. Pat. No. 4,915,072; U.S. Pat. No. 5,105,150; U.S. Pat. No. 4,062,230; and U.S. Pat. No. 5,267,159.

While these devices fulfill their respective, particular objectives and requirements, the aforementioned patents do not disclose a new cruise control economizer. The inventive device includes a housing, vehicle speed and brakes and clutch pressed cables from the cruise control, at least one optionally two POM (prolongation of momentum) switch (es), a microcontroller, a serial port, a throttle setback control and an optional mercury tilt switch.

In these respects, the cruise control economizer according to the present invention substantially departs from the conventional concepts and designs of the prior art, and in so doing provides an apparatus primarily developed for the purpose of selectively adding throttle boost to a vehicle traveling down an incline or following to gain momentum with minimum fuel consumption and prolong the momentum for maximum fuel efficiency.

SUMMARY OF THE INVENTION

In view of the foregoing disadvantages inherent in the known types of electronic controls used to control fuel supplied to a diesel engine now present in the prior art, the present invention provides a new cruise control economizer construction wherein the same can be utilized for selectively adding throttle boost to a vehicle to gain momentum with minimum fuel consumption.

The general purpose of the present invention, which will be described subsequently in greater detail, is to provide a new cruise control economizer apparatus and method which has many of the advantages of the electronic controls used to control fuel supplied to a diesel engine mentioned heretofore and many novel features that result in a new cruise control economizer which is not anticipated, rendered obvious, suggested, or even implied by any of the prior art electronic controls used to control fuel supplied to a diesel engine, either alone or in any combination thereof.

To attain this, the present invention generally comprises a housing, vehicle speed and brakes and clutch pressed cables from the cruise control, at least one, optionally two, POM (prolongation of momentum) switches, a microcontroller, a serial port, a throttle setback control.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cruise control economizer apparatus and method which has many of the advantages of the electronic controls used to control fuel supplied to a diesel engine mentioned heretofore and many novel features that result in a new cruise control economizer which is not anticipated, rendered obvious, suggested, or even implied by any of the prior art electronic controls used to control fuel supplied to a diesel engine, either alone or in any combination thereof.

It is another object of the present invention to provide a new cruise control economizer which may be easily and efficiently manufactured and marketed.

It is a further object of the present invention to provide a new cruise control economizer which is of a durable and reliable construction.

An even further object of the present invention is to provide a new cruise control economizer which is susceptible of a low cost of manufacture with regard to both materials and labor, and which accordingly is then susceptible of low prices of sale to the consuming public, thereby making such cruise control economizer economically available to the buying public.

Still yet another object of the present invention is to provide a new cruise control economizer which provides in the apparatuses and methods of the prior art some of the advantages thereof, while simultaneously overcoming some of the disadvantages normally associated therewith.

Still another object of the present invention is to provide a new cruise control economizer for selectively controlling throttle to a vehicle traveling on a downhill incline to gain momentum with minimum fuel consumption.

Yet another object of the present invention is to provide a new cruise control economizer which includes a housing, vehicle speed and brakes and clutch pressed from the cruise control, two POM (prolongation of momentum) switches, a microcontroller, a serial port, a throttle setback control and an optional mercury tilt switch.

Still yet another object of the present invention is to provide a new cruise control economizer for reducing fuel consumption by providing a maximum use of gravity to accelerate a vehicle downhill by using a partial throttle above set cruise speed to get a higher speed operation during downhill operation and by delaying return to full throttle using a partial throttle when speed falls to the set cruising speed on a flat run out and on an uphill run following downhill operations and in so doing reducing the downhill throttle to less throttle than is used to maintain set cruise speed on level ground.

Even still another object of the present invention is to provide a new cruise control economizer is useable as an add on module to existing cruise controls.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 8 thereof, a new cruise control economizer embodying the principles and concepts of the present invention and generally designated by the reference numeral 10 will be described.

More specifically, it will be noted that the cruise control economizer 10 comprises a housing, vehicle speed input and brakes and clutch pressed signal, cable to and from the cruise control, at least two prolongation of momentum (POM) switches, a microcontroller, a serial port, and a throttle setback control.

In an advanced embodiment the driver does not act as the downhill sensor. The mercury switch is utilized as a downhill sensor indicating the incline on a range of 1 to 11 percent. The mercury switch is normally closed when within plus and minus five degrees of level. The mercury switch is mounted in the controller housing at an incline of approximately six degrees upwards in front, thereby providing a closed switch contact for downward inclines from of 1 to 11 degrees. Diesel engines in particular use fuel injection systems that control the amount of fuel pressure supplied to fuel injectors. Many standard cruise control systems operate in a so called proportional control mode providing the amount of fuel needed to maintain a set cruise speed. Full throttle is applied when the vehicle speed drops to the set cruise speed. Typically 57.5 mph is the set cruise speed. The cruise control cuts back to zero percent of fuel needed to maintain speed is above the upper set point or the set cruise speed.

When the first manual switch is engaged the standard operation of a cruise control system is modified substituting a coasting throttle control setting that allows a nominal fixed percentage 80 percent of throttle set for fuel needed to maintain the cruise speed on level terrain (range is 65 to 95 percent of full throttle). When the second switch in an exclusive or relationship with the first switch is engaged 50 percent of the fuel needed to maintain speed on level terrain is supplied to the engine. In either instance, the coasting throttle control will bypass the standard fuel control signal and substitute the appropriate reduced fuel control signal to provide the reduced throttle settings as described above.

At the same time as the cruise control acquires a set cruise speed a signal can be stored in the microcontroller of the cruise control economizer for later comparison with actual speed with POM lower control limits that is the set cruising speed. Standard inputs to the on/off and proportional cruise controls include: throttle setting, cruise control on/off signal (switch input), cruise set limit control (push button input), actual vehicle speed signal, brakes and clutch pressed signal. Standard outputs include throttle setting and an indicator light showing cruise control on. In the on off cruise control when the vehicle speed is below the upper control limit fuel is added at acquired throttle setting until the vehicle exceeds the set point at which point fuel is cutoff. A full acceleration throttle is applied when speed falls below the lower control limit. When brakes or the clutch are applied the cruise control shuts off and manual throttle must be used to control fuel flow. In the proportional cruise control unit fuel is added in inverse relationship to the difference between the actual speed and the set speed. The proportional cruise control behaves such that at speeds above the set point the greater the speed the more the correction and proportionally less fuel is added and at speeds below the set speed the lower the speed a proportionally greater amount of fuel is added to bring the speed closer to the set point more rapidly. The cruise control economizer intentionally interrupts these controllers to obtain greater fuel efficiencies.

Figure 4:
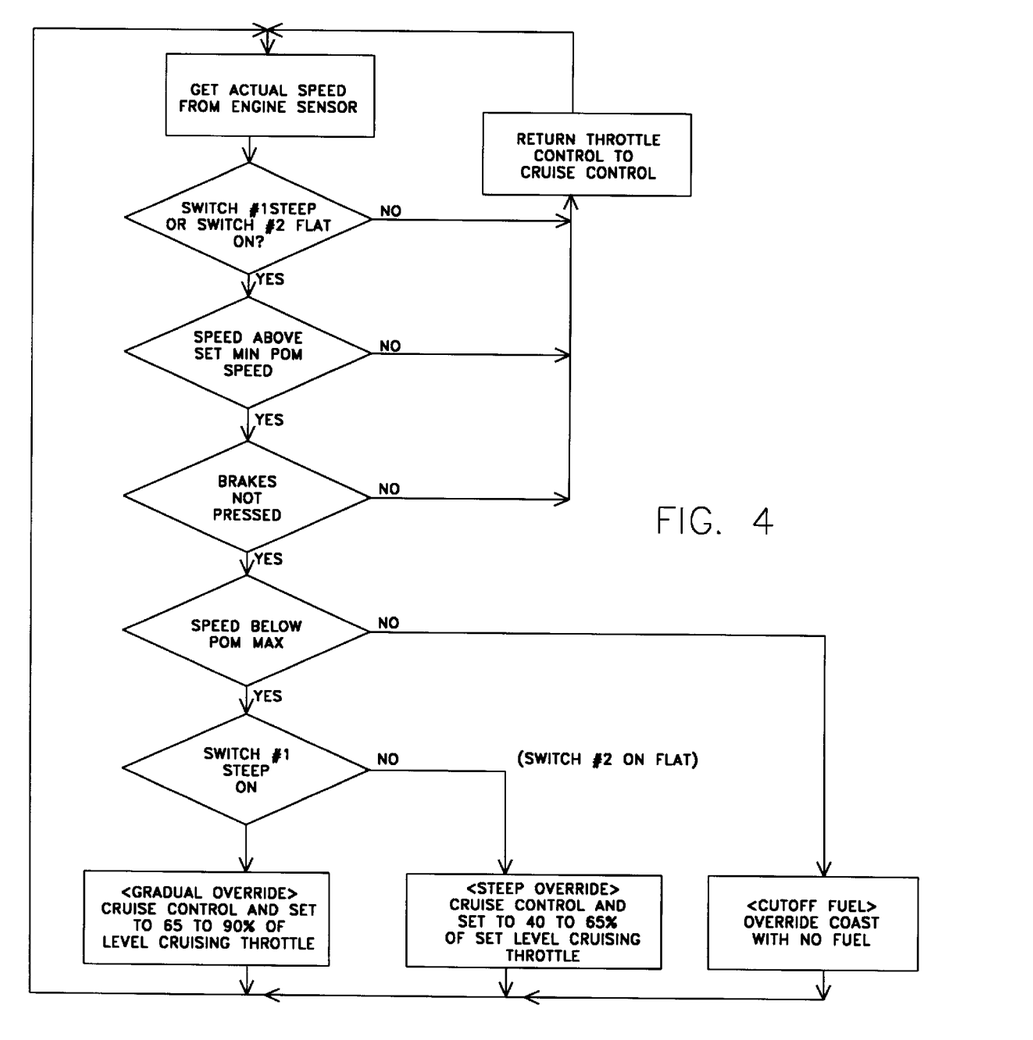
FIG. 4 is a flow chart for POM microcontroller operations for throttle override describing the method of modifying cruise control output with throttle override as shown in figure.
Figure 8:
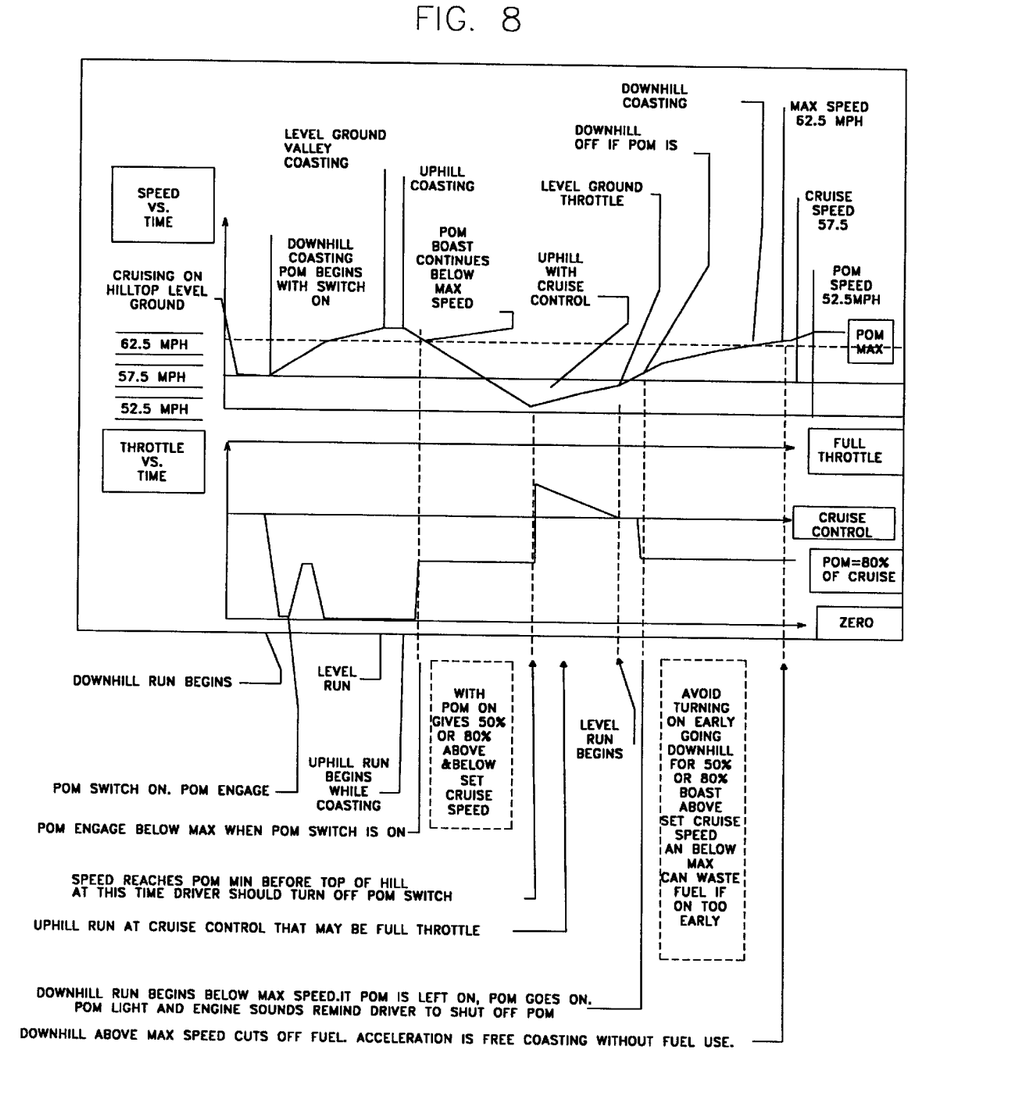
FIG. 8 is a Speed vs. Time and Throttle vs. Time chart showing operations cruising on level, coasting downhill; level and uphill, POM boost added going downhill, full throttle going uphill.

When a vehicle is on a downward incline the improved cruise control economizer modifies the acquired throttle setting to partial setback throttle setting for downhill operation. Modification depends on the setting of a switch signal to use an override throttle setting and an indicator of the degree of fuel cutoff desired. The first embodiment of the invention shown in FIGS. 1 uses switch 1 to set twenty percent fuel setback, or eighty percent of level ground throttle for a gradual incline and uses switch 2 on to set fifty percent fuel setback for a steep incline. FIG. 4 shows prolongation of momentum using a throttle override in flowchart. FIG. 8 shows the operation of the POM starting with cruising on level ground at a cruise throttle. Next the vehicle begins coasting downhill, level and uphill, POM boost added going downhill and throttle decreases as speed increases. When the POM is switched on throttle increases until speed exceed the POM Max 62.5 mph when throttle is cutoff. The vehicle coasts down hill and levels off. When the vehicle speed falls below POM MAX the 80 percent throttle begins again and is maintained until the POM MIN or the set cruise speed is reached. At that time standard cruise control start and a large amount if not full throttle runs going uphill. If POM is turned on too early or is left on fuel is wasted during what should be a zero fuel a gravity powered downhill acceleration. The second increase in speed above the set cruise speed of 57.5 miles per hour shows throttle at 80 percent of cruise throttle at the start of downhill run. The driver must shutoff the switch to avoid turning on POM too early and wasting fuel.

A first standard fuel control method being such that fuel for the engine is injected through a fuel injection nozzle which is opened for fuel injection by providing the injection nozzle analog voltage proportional to the amount of fuel that is to be fed to the engine, and the method being modified such that with switch 1 on providing partial cutoff of the fuel so that flow rate for gradual downhill operation is selectively opened for approximately 20 percent less voltage than is provided in flat terrain steady state fuel flow rate and alternatively with switch 2 on partial cutoff of the fuel flow rate for steep downhill operation is selectively opened for 50 percent less voltage than is provided in flat terrain steady state fuel flow rate.

A second standard fuel control method being such that the fuel for the engine is injected through a fuel injection nozzle which is opened for fuel injection by providing the injection nozzle with electrical pulses during periods in which the fuel is to be fed to the engine, and the ID method being modified such that with switch 1 on partial cutoff of the fuel flow rate is selectively opened by approximately 20 percent fewer pulses per unit of time for gradual downhill operation than is provided in flat terrain steady state fuel flow rate by 20 percent reduction in the duration of a pulse train without changing the width of pulses and alternatively with switch 2 on partial cutoff of the fuel flow is selectively opened by approximately 50 percent fewer pulse per unit of time for steep downhill operation than is provided in flat terrain steady state fuel flow rate by reducing duration of a pulse train by 50 percent without changing the width of pulses.

A third standard fuel control method being such that the fuel injection control circuits which employ frequency modulation of fixed pulse width digital pulsed control circuits just described may use a selectable frequency counter divider to divide the number of pulses and deliver the throttle control signal at a different rate providing 80 percent of the fuel compared to the set cruise frequency and alternatively providing 50 percent of the fuel compared to the set cruise frequency for switch 1 on for gradual downhill operations and switch 2 on for steep downhill operations respectively.

Newer electronic cruise control systems use fuel injection control circuits commonly comprising closed loop proportional controls for adjusting the fuel rate in response to the speed of the vehicle. The closed loop systems may employ voltage controlled fuel systems, frequency modulated fuel control systems, a pulse width modulation mechanism or fuel control based on the changes in duty cycle. The method of controlling of the fuel delivered is not critical. These closed loop systems require an different method of modifying the cruise control that is not an electronic throttle setback control between the cruise controller and the fuel delivery system but rather a modification of the input to the cruise control that produces the same result in a different way.

Figure 2:
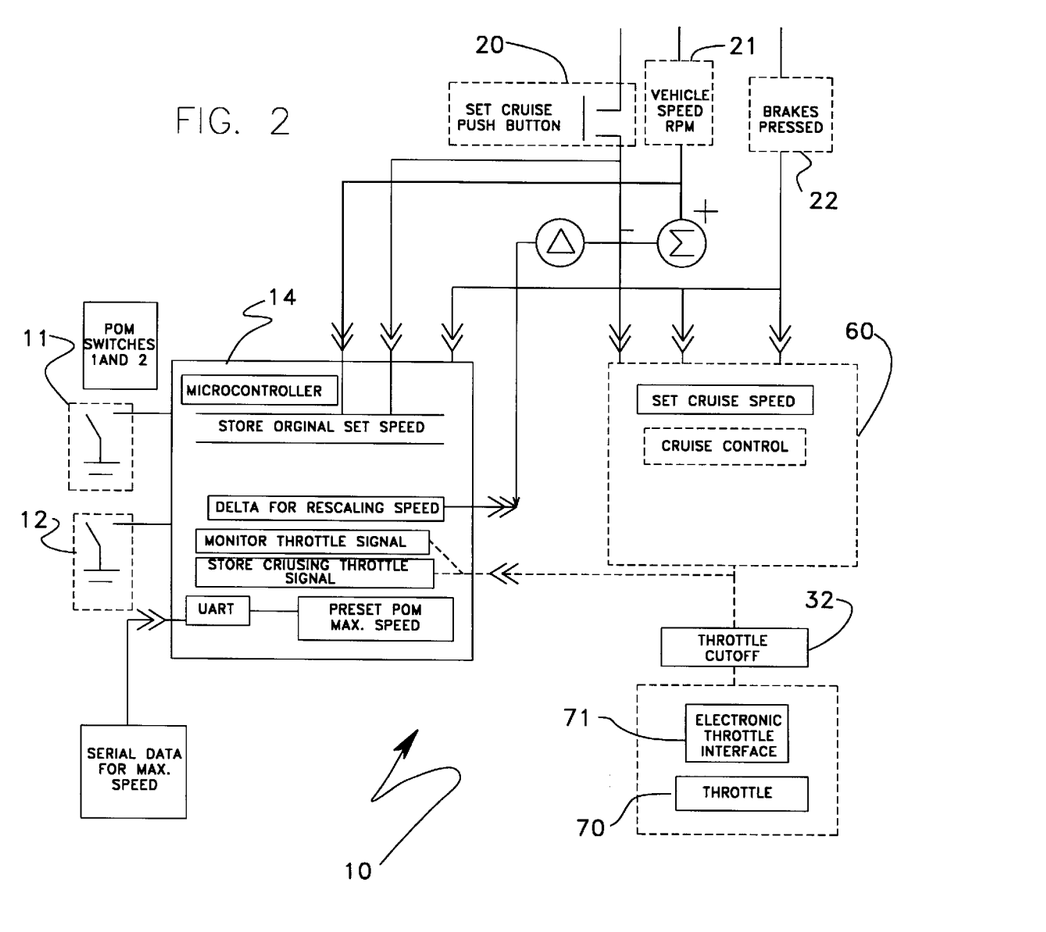
FIG. 2 is a schematic block diagram of the cruise control economizer of the present invention with vehicle speed input to cruise control modulated by adding a delta signal.
Figure 5:
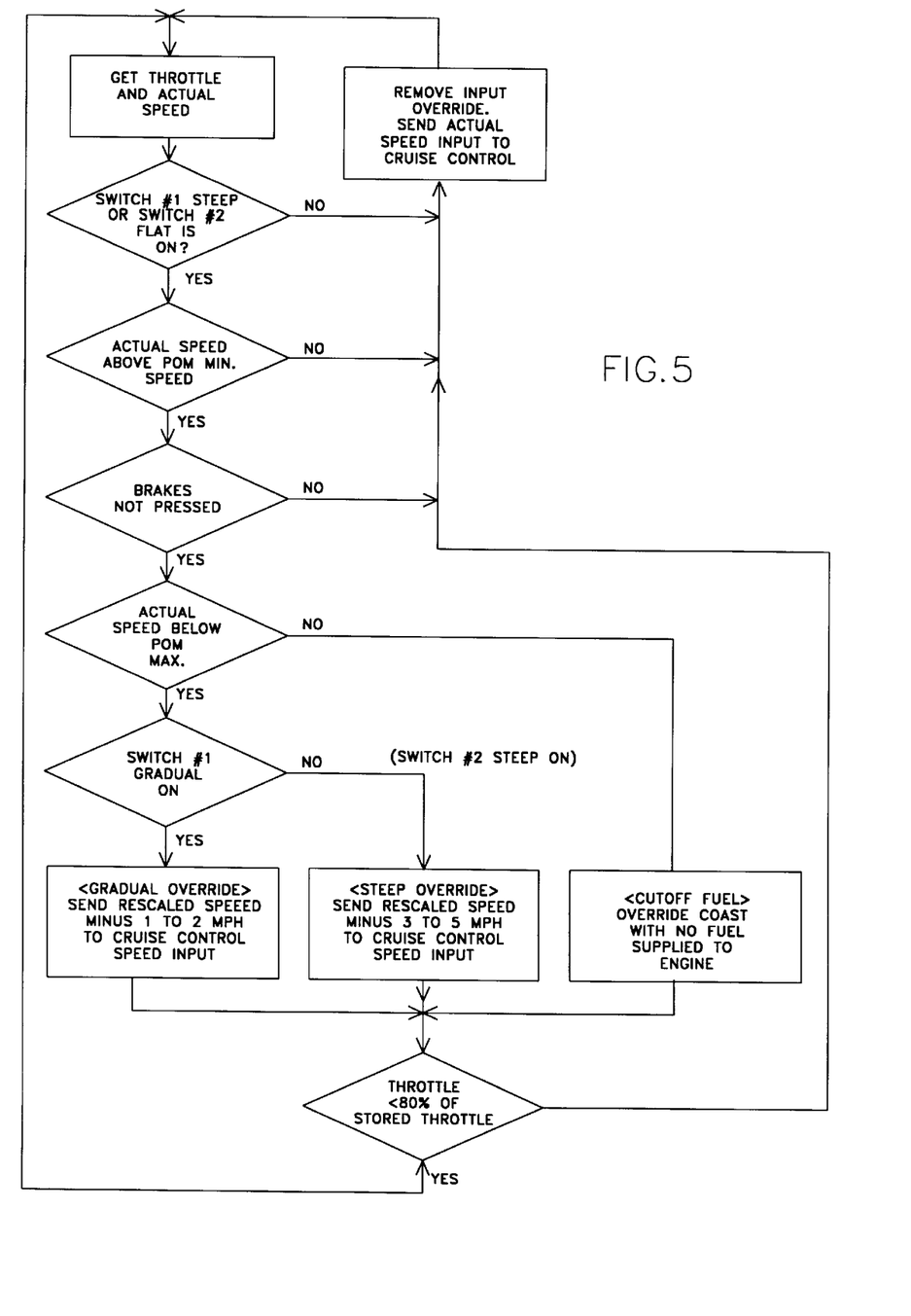
FIG. 5 is a is a flow chart for the microcontroller instructions for the method of modifying cruise control input by adding a minus delta speed signal corresponding to the system shown in FIG. 2.
Figure 6:
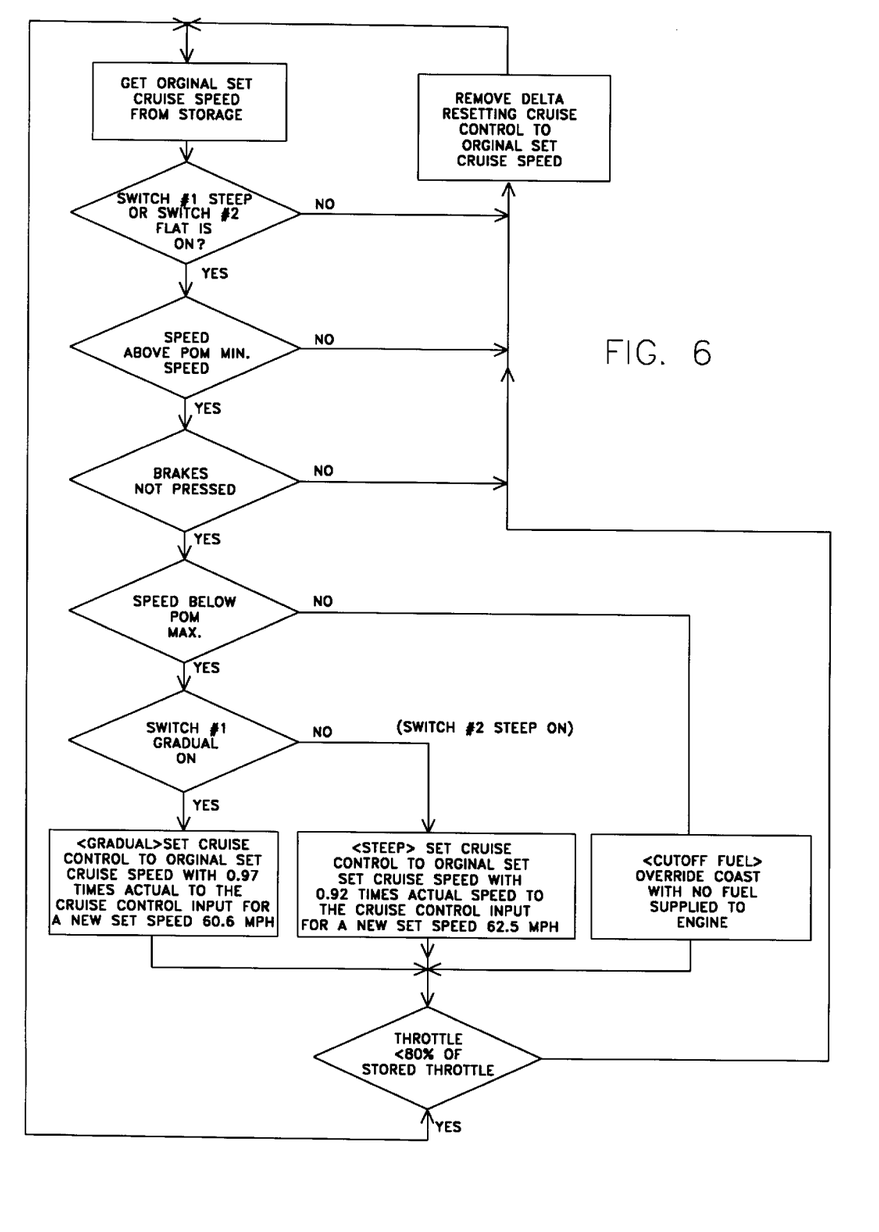
FIG. 6 is a flow chart for the microcontroller instructions for the method of modifying cruise control input by speed divider rescaling corresponding to the system shown in FIG. 3.
Figure 7:
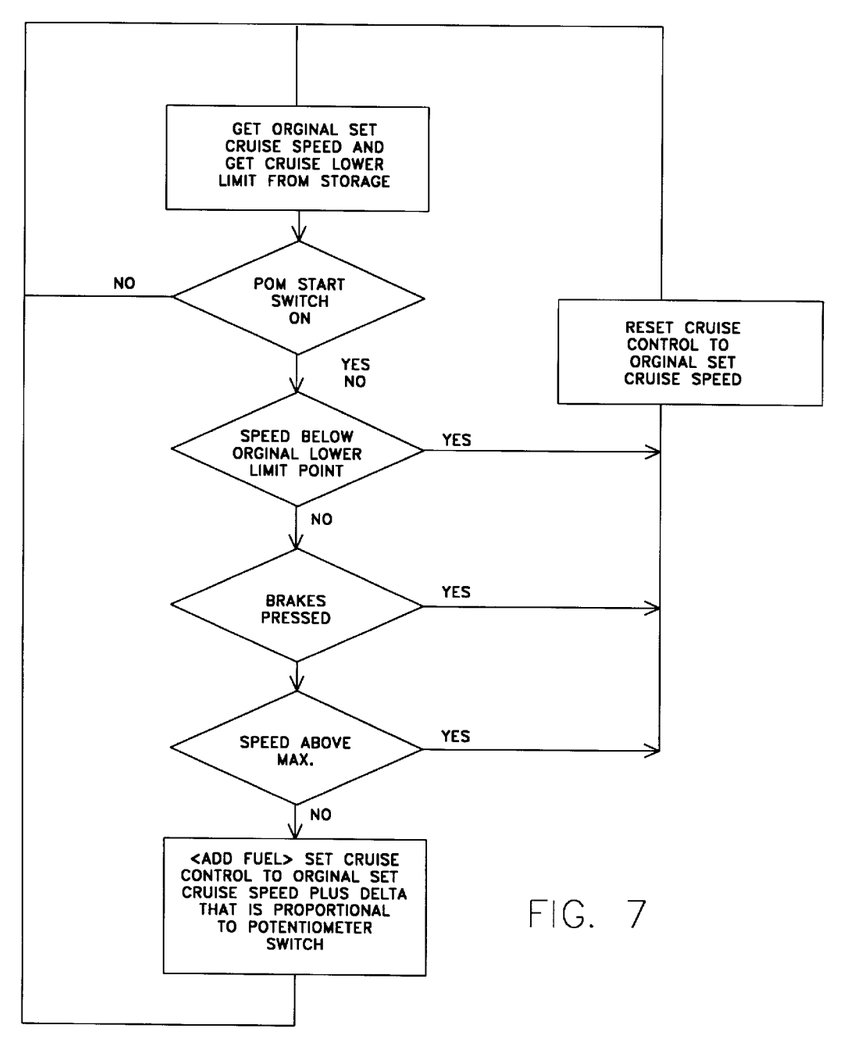
FIG. 7 is diagrammatic view of a vehicle with the location of the prolongation of the prolongation of momentum apparatus in the cab and throttle signal override switch located in the engine compartment.

A fourth method of modification of cruise control throttle controls the vehicle speed indicator signal that is supplied to the cruise control. A higher speed input causes the cruise control to proportionally reduce the throttle and produces the same result as a setback throttle reduction in fuel supply by changing the speed input to the cruise control. Instead of supplying a throttle override and increased throttle signal. FIG. 2 shows the throttle increase is controlled by a summation of the delta error added to the input. Flowchart FIG. 5 shows prolongation of momentum by a method that temporarily resets cruise speed.

Figure 3:
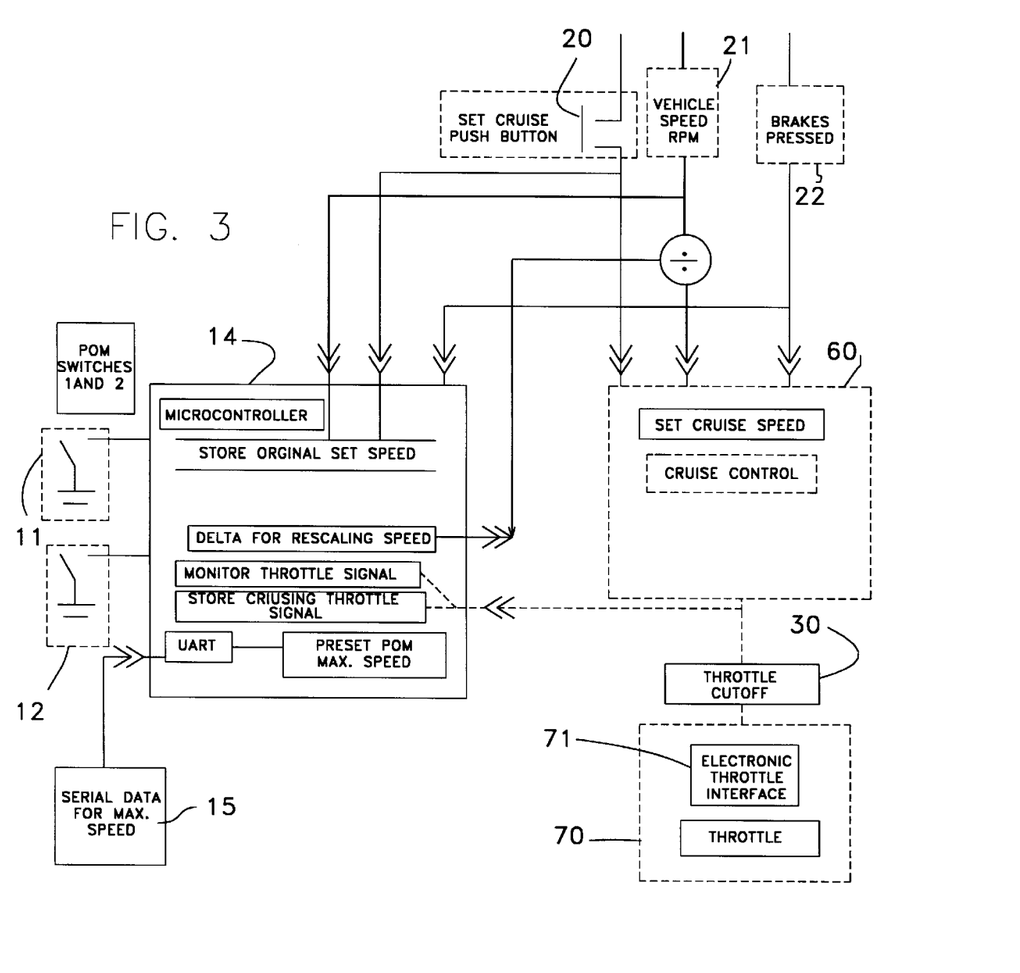
FIG. 3 is schematic block diagram of the cruise control economizer of the present invention with vehicle speed input connected to a cruise control with vehicle speed input cruise control modulated by frequency divider control.

FIG. 3 shows a division of the input speed frequency by a ratio that produces added speed faster than the set cruise speed for the downhill run. When the bottom of the hill is reached and more throttle is used to maintain high speed going uphill, POM is switched off by the driver. Cruise control limit is reset to original using an inverse ratio to multiply by the actual speed by the inverse ratio so that the original set cruise speed is sent to the cruise control when the reset cruise signal is given to the cruise control.

Figure 1:
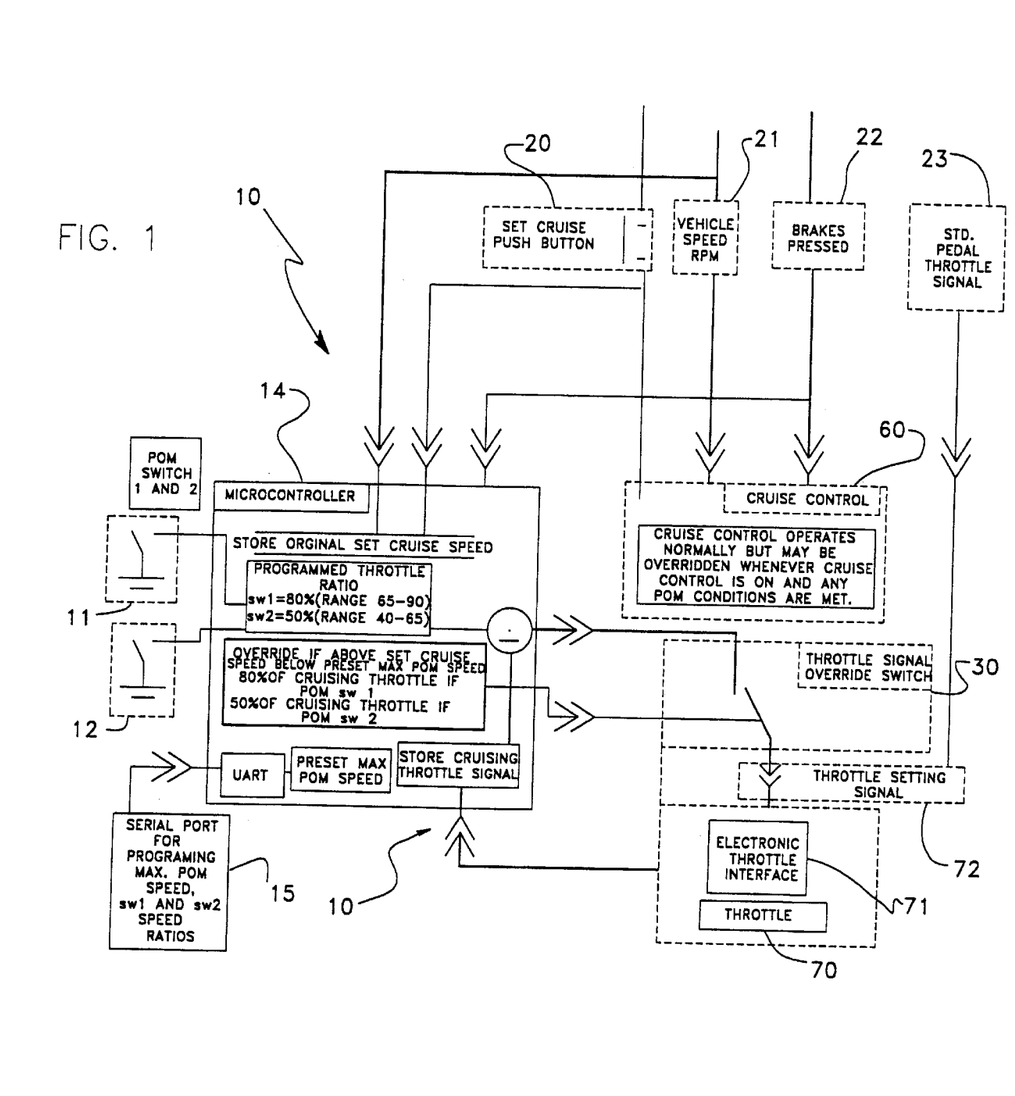
FIG. 1 is a schematic block diagram of the cruise control economizer of the present invention using a throttle override.

The methods that temporarily reset cruise control speeds may be the only method that can be used as an add on to existing cruise controls fuel control systems that cannot be internally modified with a throttle signal override shown in FIG. 1. The preferred embodiment for the fourth method in add on situation with the switch 1 on the engine RPM signal going to the cruise control circuit and adds a delta to the RPM signal sending a pseudo speed indication to the control circuit that indicates RPM speed equivalent to 3 to 5 mph lower than the actual speed causing the cruise control circuit to effectively be reset to a few miles faster for steep downhill runs and temporarily increase fuel delivered to the engine during a short period at the end of a steep downhill run. Similarly delta RPM for a gradual incline using switch two on is equivalent to 1 to 3 mph. The fourth method has several disadvantages. First, constant throttle is not employed so efficiency is not greatly improved. Second, the throttle must vary at exactly the right times to get the higher speed and added momentum at the bottom of the hill. The driver must recognize when uphill is reached and shutoff the speed increase or the system will just increase cruising speed and reduce fuel efficiency.

It should noted that it is not the object of the present invention to reduce an overall speed of travel, but rather to reduce costly fuel expenses. This reduction in cost would in turn reduce overhead and contribute to additional profits without reducing the expediency of delivery of product.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cruise control economizer for controlling an electronically controlled throttle for selectively modulating fuel flow from an injector pump of an engine by selectively adjusting fuel pressure in accordance with a throttle setting signal, comprising:

the throttle setting signal being a cruise control throttle signal delivered to an electronic throttle interface;

a cruise control receiving a brakes or clutch pressed signal and a set cruise signal;

the cruise control operating in closed loop control to maintain a set cruise speed while the brakes or clutch pressed signal is not on;

an electronic setback throttle control for modifying the cruise control throttle setting signal; and POM switches for indicating on and off states when prolongation of momentum is desired and for indicating a big fuel cutback setting and a small fuel cutback setting;

the POM switches being connected to a microcontroller that operates using a control method such that upon the conditions that at least one of the POM switches is on and the vehicle speed is below a preprogrammed maximum limit and above a preprogrammed lower POM limit and the brakes or clutch pressed signal is not on;

the microcontroller sends the electronic setback throttle a cruise override signal and a throttle setting that in accord with POM switch indicator and replaces the cruise control throttle control signal going to the throttle with an override throttle control signal that is approximately 80 percent of the set cruise throttle for the small fuel cutback setting and 50 percent of the set cruise throttle for the big fuel cutback setting whereby the electronic fuel control modulates the fuel flow accordingly.

2. The cruise control economizer of claim 1, including:

a mercury switch having a closed circuit characteristic for positions within 5 degrees of horizontal;

the mercury switch also having a front end and a rear end oriented parallel with the direction of vehicle travel;

the mercury switch being mounted in a control box on the vehicle wherein the mercury switch is inclined upwardly in front at approximately five and one half degrees at a from the vehicle horizontal, thereby providing closed circuit characteristic from a one half degree to 11 and one half degrees downhill orientation of the vehicle;

wherein the microcontroller utilizes debouncing circuits and input smoothing algorithms for ignoring jolts and road bumps that cause intermittent open circuit characteristic of the mercury switch.

3. The cruise control economizer of claim 2, wherein:

the POM switch is capable of setting a big fuel cutback and a small fuel cutback which comprises a first on/off switch and a on/off second switch in an exclusive OR relationship with each other, wherein the exclusive or relationship allows only one switch to be closed at a given time;

the first switch having an off position for delivering no cruise override signal to the electronic setback throttle control and an on position for delivering an on signal to the microcontroller, directing the micro controller to send the small cutback 80 percent throttle to the electronic setback throttle control when the downhill indicator is on, and the second switch having an off position for delivering no cruise override signal to the electronic setback throttle control and an on position for delivering an on signal to the microcontroller directing the controller to send the big cutback 50 percent throttle setback to the electronic setback throttle control when the downhill indicator is on and the brakes or clutch pressed signal is not on.

4. The cruise control economizer of claim 1, wherein:

the POM switch is capable of setting a big and a small fuel cutback comprises a switched potentiometer in serial connection with the microcontroller input, the switched potentiometer having an on and off position and in the on position being capable of reaching a first extreme position and a second extreme position and infinite gradations there between, the microcontroller input having an interface capable of recording potentiometer value, the potentiometer value in the on position being used for delivering a grade indicating signal proportional to grade, the potentiometer value directing the microcontroller to send a cruise override signal and a setback throttle setting 10 percent less than the set cruise throttle to the electronic setback throttle controller when the downhill indicator is at the first extreme position for gradual incline, the potentiometer value directing the controller to send microcontroller to send a cruise override signal and a setback throttle setting 50 less than the set cruise throttle to the electronic setback throttle controller when the potentiometer is in the second extreme position for steep incline, the potentiometer being thereby capable of indicating an infinite range between gradual incline and steep incline depending on the position of the potentiometer, and the microcontroller being capable of delivering a setback throttle setting between 10 and 50 percent less that the set cruise throttle setting depending on the potentiometer value.

5. The cruise control economizer of claim 4, wherein the cruise control uses a frequency based electronically controlled throttle for selectively modulating fuel flow from the injector pump to the engine by selectively adjusting fuel pressure in accordance with a throttle setting signal, the electronic setback throttle control for modifying the cruise control throttle setting using a frequency from the cruise control is a frequency and the electronic throttle control comprises a microcontroller controlled scaleable frequency divider interposed between the cruise control throttle output and the electronically controlled throttle.

6. The cruise control economizer of claim 4, wherein the cruise control uses a voltage based electronically controlled throttle for selectively modulating fuel flow from the injector pump to the engine by selectively adjusting fuel pressure in accordance with a throttle setting signal, the electronic setback throttle control for modifying the cruise control throttle setting using a voltage from the cruise control, and wherein the electronic setback throttle control for modifying the electronic setback throttle control comprises a microcontroller controlled voltage scalar interposed between the cruise control throttle output and the electronically controlled throttle.

7. The cruise control economizer of claim 6, wherein the cruise control economizer electronic setback throttle control comprises a cruise control speed input modifier and achieves throttle control employing a control method such that the cruise control economizer records the set cruise speed at the same time as the cruise control, further upon the setting of the POM on switch, the control method uses a modified speed input signal to the cruise control input indicating a speed that is three to five miles per hour above the actual speed so long as the actual speed is below the maximum speed and the brakes or clutch are not pressed and maintains the input at actual minus delta until the actual speed falls below the POM lower limit at which time the actual set speed control is reinstated in the cruise control removing the overriding delta input, returning control to the cruise control, and resetting the cruise control at the set cruise speed.

* * * * *